Feb. 5, 1952     S. J. POPEIL     2,584,737
FOOD SLICER
Filed Dec. 9, 1949
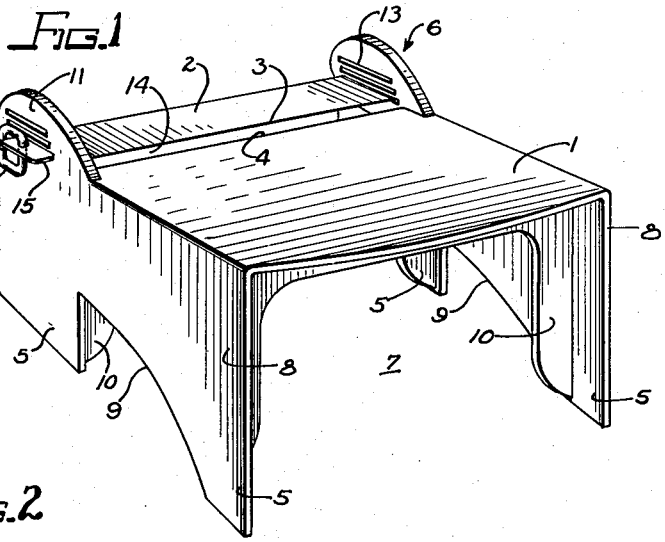
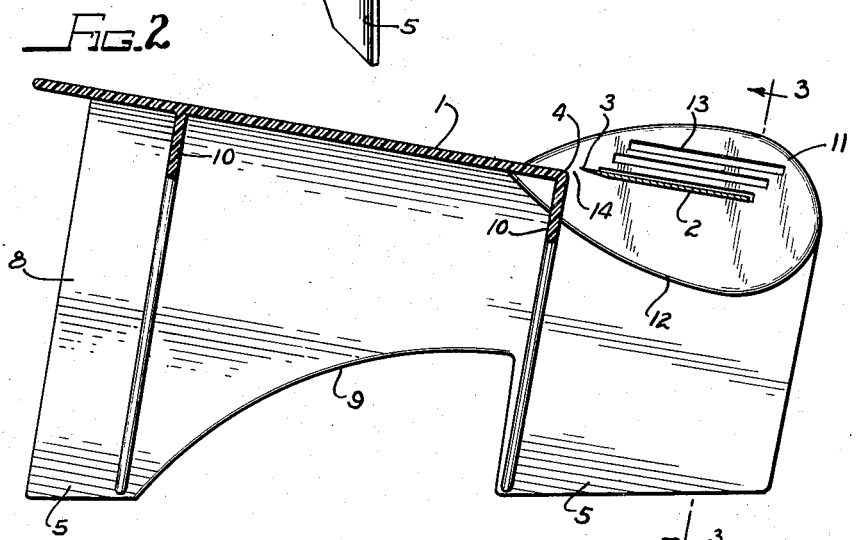
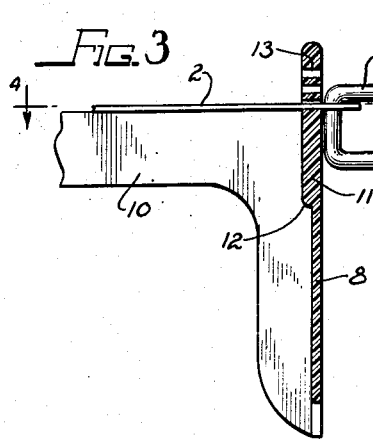
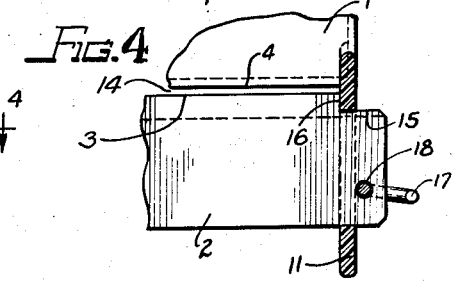
INVENTOR.
Samuel J. Popeil Patented Feb. 5, 1952

2,584,737

UNITED STATES PATENT OFFICE 2,584,737

FOOD SLICER

Samuel J. Popeil, Chicago, Ill.

Application December 9, 1949, Serial No. 132,065

6 Claims. (Cl. 146—171)

1

The present invention relates to improvements in food slicers, and has particular reference to slicers of the type adapted to be supported on some working surface in a kitchen and to have a selected vegetable, fruit or other food product thereon movable by hand manipulation repeatedly through cutting engagement with a blade adjusted to take slices of predetermined thickness therefrom.

One of the objects of the present invention is to provide a new and improved food slicer having simple and conveniently manipulable means for adjusting the cutting position of the blade.

Another object is to provide a novel food slicer having a minimum number of separate parts requiring assembly.

A further object is to provide a food slicer having a unitary or one-piece frame structure which may be formed in an injection molding operation and requires no assembly and a minimum finishing operation.

Another object is to provide a food slicer having a unitary box-like frame structure with depending side walls, portions of the walls being projected upwardly and formed with series of parallel slots spaced laterally and offset longitudinally to receive and support the blade selectively for progressive height adjustment.

Further objects and advantages will become apparent as the description proceeds.

In the accompanying drawings,

Fig. 1 is a perspective view of a food slicer embodying the features of the present invention.

Fig. 2 is a longitudinal vertical sectional view.

Fig. 3 is a fragmentary transverse sectional view taken along line 3—3 of Fig. 2.

Fig. 4 is a fragmentary sectional detail view taken along line 4—4 of Fig. 3.

Referring more particularly to the drawings, the food slicer constituting the exemplary embodiment of the invention comprises generally a platform or deck 1 on which the article of food to be sliced is adapted to be positioned and held in the grasp of the user; a cutting element 2, preferably in the form of a substantially flat blade, having a longitudinal sharp cutting edge 3 extending in closely spaced relation along one end edge 4 of the platform and in a plane parallel to and elevated above the plane of the platform; suitable means, preferably in the form of corner legs 5 depending from the side edges of the platform to support the latter in elevated position on a kitchen work surface (not shown); and means, indicated generally at 6, for supporting the blade for adjustment selectively into any one of a series of positions at different elevations in relation to the top surface of the platform.

The platform 1 and supporting legs 5 are formed to constitute a box-like frame. Preferably, this frame is of inverted rectangular U-shape so as to define an interior space 7 beneath the platform 1 and open at the bottom and ends. The legs 5 are formed on parallel side walls 8 which extend downwardly at right angles from the marginal side edge portions of the platform 1, and which are formed in their bottom edges with suitable intermediately-located notches 9. The side walls 8 are tapered in vertical width from end to end so that the front legs 5 are of greater height than the rear legs, thereby disposing the platform 1 at an angle to slope downwardly from front to rear. By reason of the foregoing frame construction, the space 7 in which the food slices collect is ample in size and readily accessible.

To insure adequate strength and rigidity, suitable reinforcing ribs 10 may be provided within the frame structure. In the present instance, two spaced parallel ribs 10 are provided, each rib extending transversely across the underside of the platform 1 and then downwardly along the insides of one set of legs 5. One of the transverse ribs 10 is located between the rear legs 5 and substantially beneath the terminal edge 4 to sustain the latter against flexure, and the other is located between the front legs and slightly inwardly from the front end of the platform 1.

One of the important features of the invention resides in the blade supporting means 6 which serves to hold the blade 2 effectively in cooperative spaced relation to the top or working surface of the platform 1 and the terminal edge 4 thereof, and which facilitates quick, positive and convenient adjustment of the position of the blade to vary this spaced relation in accordance with the desired thickness of slices into which the food is to be cut. In the present instance, the blade supporting means 6 comprises two parallel lugs 11 projecting upwardly from opposite sides of the frame structure and rearwardly of the terminal edge 4 of the platform 1, and in effect constituting upward extensions of the side walls 8. Preferably, the wall thickness of the lugs 11 is increased over that of the walls 8 on the inside surfaces and over a tear shaped area as indicated at 12. Each of the lugs 11 is formed with a series of narrow parallel blade-receiving slots 13 each of which slots is closed at its ends and each of which slots passes completely through the lugs 11. The slots 13 are also parallel to the top plane of the platform 1, and are spaced vertically by uniform increments. The slots of the two sets are the same in number and spacing, and are in respective registration with each other crosswise of the frame structure. Thus, opposite ends of the blade 6 may be inserted through the lowermost slots 13, and in this position the blade will be located with its cutting edge 3 spaced only slightly above and slightly to the rear of the terminal edge 4 to cut slices of minimum thickness as the food is slid along the platform 1 by hand pressure repeatedly through cutting engagement therewith. The edges 3 and 4 define a narrow space 14 therebetween which, due to the rearward spacing of the edge 3, is somewhat wider than the thickness of the slices, and which therefore provides sufficient clearance to permit the several food slices to pass therethrough and drop freely into the interior of the frame structure.

Although any suitable number of slots 13 with any desired gradations of spacing may be employed, in the present instance, each set comprises three slots defining three different blade positions which is believed to be adequate for most requirements. When located in the intermediate slots 13, the blade 2 will be spaced at a greater height away from the plane of the platform 1 than in the first position of adjustment to cut somewhat thicker food slices. Likewise, when located in the uppermost slots 13, the blade 6 will be in position of adjustment to cut slices of maximum thickness. As the blade 6 is adjusted to cut slices of increased thickness, it is desirable to provide correspondingly increased clearance at the space 14, and hence each slot 13 is located in rearwardly offset but overlapping relation with respect to the next lower slot. In short, the successive companion slots 13 of the registering series are located at progressively increasing increments, not only vertically, but also rearwardly from the platform 1, thus resulting in a correlated change in the width of the space 14 as the blade 6 is changed selectively from any one position to another.

To provide means for retaining the blade 2 releasably in selected position of adjustment, a rectangular notch 15 is formed in one end portion of one longitudinal edge, preferably the cutting edge 3, thereby in effect reducing the width of the blade for a short distance at one end. The slots 13 of one set are correspondingly less in length to receive the reduced end of the blade. To assemble, the narrow end of the blade is inserted through one of the long slots, conforming in length to the full width of the blade, and then into the opposed registering short slot. The transverse edge of the notch 15 defines a shoulder or abutment 16 which is engageable with the inner surface of the associated lug 11 to locate the blade endwise. A split lock ring 17 is removably inserted through a small hole 18 in the reduced projecting end of the blade outside of the associated lug 11 forming a removable abutment engageable with the outer surface of the associated lug to prevent the blade from sliding out of place.

Within the broad concept of the invention, the frame structure may be made of any desired number of parts and of any suitable material. More specifically, however, the frame structure, including the lugs 11, is made of a suitable thermoplastic material, such for example as polystyrene, and is molded in one integral or unitary piece. Thus, the food slicer may comprise merely three separate preformed parts, namely, the frame structure, the blade 2 and the ring 17.

It will be evident that I have provided a new and improved food slicer which is simple and inexpensive in construction. The frame structure is so constructed and provided with the requisite draft that it may be easily and quickly produced by injection molding, and without necessitating any assembly or extensive finishing operation. Whether made of plastic or metal, the frame structure is rigid and sturdy in form, and ready and convenient in use, affording ample and accessible space for the food slices. The cutting blade 2, consisting merely of a flat strip of steel, may be inexpensively produced by sharpening and otherwise processing long strips of steel, and then merely severing therefrom blades of proper length ready for use.

The blade locating and holding arrangement is also comparatively simple, and facilitates quick and convenient height of blade adjustment. Complexity and uncertainty of adjustment are avoided. In use, and assuming that the blade 6 has been located in the desired position of adjustment, the food to be sliced need merely be placed on the platform 1 and moved thereon by hand manipulation quickly and repeatedly through cutting engagement with the blade. It will be evident that the device may be used advantageously for shredding or slicing many different food products. It is well suited for such vegetables as potatoes, tomatoes, carrots, turnips, beets, onions and cabbage, etc. It may also be used for slicing hard-boiled eggs, cheese and certain meat products. Likewise, it may be used for slicing various fruits, such for example as lemons, oranges, apples, bananas, etc. After use, and because of the simplicity of construction and ease of assembly, the device can be quickly and thoroughly washed.

I claim as my invention:

1. A food slicer having, in combination, a frame structure defining a flat top working surface with a transverse terminal edge at one end, and lugs projecting respectively from opposite sides of said structure upwardly above said surface and endwise beyond said edge, said lugs being formed with registering series of parallel slots, the slots of each series being disposed in parallel relation to and progressively increasing distances above said surface, the slots of each series being disposed in progressively increasing longitudinally offset distance endwise away from said surface in direct relation to their distance of location above said surface, a cutting blade with a sharp cutting edge disposed in opposed relation to said terminal edge, the opposite ends of said blade being removably inserted selectively into any one pair of companion slots of said registering series to locate and maintain said blade in predetermined parallel spaced offset relation to said surface, and means for maintaining said blade in endwise position in the selected slots.

2. A food slicer having, in combination, a frame structure defining a flat top working surface with a transverse terminal edge at one end, and lugs projecting respectively from opposite sides of said structure upwardly above said surface and endwise beyond said edge, said lugs being formed with registering series of parallel slots, the slots of each series being disposed in parallel relation to and progressively increasing distance above said surface, a cutting blade with a sharp cutting edge disposed in opposed relation to said terminal edge, the opposite ends of said blade being removably inserted selectively into any one pair of companion slots of said registering series to locate and maintain said blade in predetermined parallel spaced offset relation to said surface, said blade being formed with a notch in one end of one longitudinal edge and being thus reduced in width at said end to define a transverse locating shoulder, one series of slots being of a length to receive the narrow end of said blade and less than the full width of said blade, said shoulder being engageable with the adjacent lug to locate said blade endwise, and releasable means for maintaining said blade in the selected pair of slots.

3. A food slicer comprising, in combination, a frame structure having a generally horizontal top wall defining a flat working surface with a transverse terminal edge at the rear end thereof, substantially perpendicular side walls disposed along the marginal side edges of said top wall and each including a portion extending below and a portion extending upwardly and rearwardly of the terminal edge of the top wall, the upwardly and rearwardly extending portions of said walls being provided with a registering series of slots closed at their ends and extending completely through said upwardly and rearwardly extending portions, the slots of each series being disposed in substantially parallel relation to and progressively increasing in height above said top wall and being disposed in progressively increasing longitudinal offset distance endwise away from said transverse terminal edge of said working surface in direct relation to their distance of location above said surface, a flat cutting blade having a sharp cutting edge along one of its side edges and being insertable through any one pair of companion slots of said registering series with the cutting edge of said blade disposed in opposed relation to said terminal edge and above said top wall, said blade being retained against transverse movement by the ends of the slots, and means for maintaining said blade in endwise position within said slots.

4. A food slicer as defined in claim 3, wherein the upwardly and rearwardly extending portion of each side wall comprises a lug of greater thickness than the remainder of said side wall.

5. A food slicer comprising, in combination, a frame structure having a generally horizontal top wall defining a flat working surface with a transverse terminal edge at the rear end thereof, substantially perpendicular side walls disposed along the marginal side edges of said top wall and each including a portion extending below and a portion extending upwardly and rearwardly of the terminal edge of the top wall, the upwardly and rearwardly extending portions of said walls being provided with a registering series of slots closed at their ends and extending completely through said upwardly and rearwardly extending portions, the slots of each series being disposed in substantially parallel relation to and progressively increasing in height above said top wall, said slots of each of said series being disposed in progressively increasing longitudinal offset distance endwise away from said terminal edge of said working surface in direct relation to their distance of location above said surface, a flat cutting blade having a sharp cutting edge along at least one of its side edges and being insertable through any one pair of companion slots of said registering series with the cutting edge of said blade disposed in opposed relation to said terminal edge and above said top wall, said blade being retained against transverse movement by the ends of the slots, and means for maintaining said blade in endwise position within said slots.

6. A food slicer comprising, in combination, a frame structure of inverted rectangular U-shape cross section and having a generally horizontal top wall defining a flat working surface with a transverse terminal edge at the rear end, substantially perpendicular depending side walls extending along the marginal side edges of said top wall and adapted to rest their lower edges on a support, said side walls including portions projecting rearwardly and upwardly of said top wall beyond said terminal edge to define transversely-spaced elevated lugs, said lugs being formed with registering series of slots having closed ends and extending completely through said lugs and the slots of each series being disposed in substantially parallel relation to and progressively increasing in height above said top, the series of slots in one lug being of individual lengths less than that of the slots in the series of slots in the other lug, a flat cutting blade having a sharp cutting edge along at least one side edge and being of a width not exceeding that of the individual length of the longer of said slots, said cutting blade being insertable selectively through said longer of said slots into any one pair of companion slots of said series, said cutting blade being reduced in width at one end to permit said reduced portion to pass through the shorter of said slots and to form a fixed abutment engaging the inner surface of the adjacent lug to prevent said blade from passing completely through the shorter of said slots, said cutting blade having a hole in said reduced end portion spaced from said fixed abutment a distance substantially equal to the thickness of the lug containing the series of shorter slots, said opening being disposed beyond the outer face of said last-mentioned lug when said reduced end is passed through one of the shorter of said slots, and a locking member removably insertable in said hole to constitute a removable abutment adjacent the outer face of said last-mentioned lug, said abutments maintaining said blade in endwise position within said slots.

SAMUEL J. POPEIL.

REFERENCES CITED

The following references are of record in the file of this patent:

UNITED STATES PATENTS

| Number | Name | Date |
|---|---|---|
| D. 162,106 | Wolff | Feb. 20, 1951 |
| 537,831 | Kraemer | Apr. 23, 1895 |
| 1,164,241 | Walker | Dec. 14, 1915 |
| 2,401,668 | Senkewitz | June 4, 1946 |
| 2,501,076 | Morris | Mar. 21, 1950 |

FOREIGN PATENTS

| Number | Country | Date |
|---|---|---|
| 35,891 | Germany | June 5, 1886 |
| 455,607 | Great Britain | Oct. 26, 1936 |
| 664,477 | Germany | Sept. 1, 1938 |